(12) United States Patent
Chaiken et al.

(10) Patent No.: US 11,314,582 B2
(45) Date of Patent: Apr. 26, 2022

(54) SYSTEMS AND METHODS FOR DYNAMICALLY RESOLVING HARDWARE FAILURES IN AN INFORMATION HANDLING SYSTEM

(71) Applicant: Dell Products L.P., Round Rock, TX (US)

(72) Inventors: Craig L. Chaiken, Pflugerville, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 16/910,660

(22) Filed: Jun. 24, 2020

(65) Prior Publication Data

US 2021/0406113 A1  Dec. 30, 2021

(51) Int. Cl.
*G06F 11/07* (2006.01)

(52) U.S. Cl.
CPC ...... *G06F 11/0793* (2013.01); *G06F 11/0706* (2013.01); *G06F 11/0751* (2013.01)

(58) Field of Classification Search
CPC ............. G06F 11/0706; G06F 11/0751; G06F 11/079; G06F 11/0793; G06F 11/1417; G06F 11/1438; G06F 11/1441
USPC ........................................................ 713/1, 2
See application file for complete search history.

(56) References Cited

U.S. PATENT DOCUMENTS

| | | | | |
|---|---|---|---|---|
| 9,798,624 | B2* | 10/2017 | Herzi | G06F 11/1435 |
| 10,514,972 | B2* | 12/2019 | Chaiken | G06F 11/0754 |
| 2018/0074884 | A1* | 3/2018 | Cady | G06F 11/0787 |

* cited by examiner

*Primary Examiner* — Joseph R Kudirka
(74) *Attorney, Agent, or Firm* — Jackson Walker L.L.P.

(57) ABSTRACT

An information handling system may include a processor and a basic input/output system configured to, responsive to an occurrence of an exception error, triage among various hardware components of the information handling system to determine existence of any signatures of potential hardware failures, write a database structure to a non-volatile memory including the signatures of potential hardware failures, upon boot of the basic input/output system, enable one or more control methods for hardware failure mitigations associated with the signatures of potential hardware failures, and perform the mitigations during execution of an operating system of the information handling system.

21 Claims, 2 Drawing Sheets

SYSTEMS AND METHODS FOR DYNAMICALLY RESOLVING HARDWARE FAILURES IN AN INFORMATION HANDLING SYSTEM

TECHNICAL FIELD

The present disclosure relates in general to information handling systems, and more particularly to methods and systems for dynamically resolving hardware failures in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include many hardware devices that must function in concert with each other, and must function as expected in order for the information handling system as a whole to function appropriately. Hardware failures leading to system inoperability may be caused by hardware itself, device firmware, a management engine, a basic input/output system (BIOS), drivers, or an operating system. Hardware failures are often similar from generation to generation of information handling systems.

Sometimes a failure may be resolved with an update to software. However, very often hardware failures may not be as easily resolved, and may include issues which may require a long lead time for repair, as may be in the case of soldered down motherboard devices that may require an expensive motherboard replacement. Another expensive repair may be that of a hardware or firmware failure of a device that causes an information handling system to "hang" even upon reboot.

Sometimes such failures may have workarounds that return an information handling system to operability in the event of a hardware issue. However, such workarounds are often undocumented and often require manual application.

SUMMARY

In accordance with the teachings of the present disclosure, the disadvantages and problems associated with hardware failures may be reduced or eliminated.

In accordance with these and other embodiments of the present disclosure, an information handling system may include a processor and a basic input/output system configured to, responsive to an occurrence of an exception error, triage among various hardware components of the information handling system to determine existence of any signatures of potential hardware failures, write a database structure to a non-volatile memory including the signatures of potential hardware failures, upon boot of the basic input/output system, enable one or more control methods for hardware failure mitigations associated with the signatures of potential hardware failures, and perform the mitigations during execution of an operating system of the information handling system.

In accordance with these and other embodiments of the present disclosure, a method may include, in a basic input/output system of an information handling system: responsive to an occurrence of an exception error, triaging among various hardware components of the information handling system to determine existence of any signatures of potential hardware failures, writing a database structure to a non-volatile memory including the signatures of potential hardware failures, upon boot of the basic input/output system, enabling one or more control methods for hardware failure mitigations associated with the signatures of potential hardware failures, and performing the mitigations during execution of an operating system of the information handling system.

In accordance with these and other embodiments of the present disclosure, an article of manufacture may include a processor and a non-transitory computer-readable medium and computer-executable instructions carried on the computer-readable medium, the instructions readable by a processor, the instructions, when read and executed, for causing the processor to, in a basic input/output system of an information handling system: responsive to an occurrence of an exception error, triage among various hardware components of the information handling system to determine existence of any signatures of potential hardware failures; write a database structure to a non-volatile memory including the signatures of potential hardware failures; upon boot of the basic input/output system, enable one or more control methods for hardware failure mitigations associated with the signatures of potential hardware failures; and perform the mitigations during execution of an operating system of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
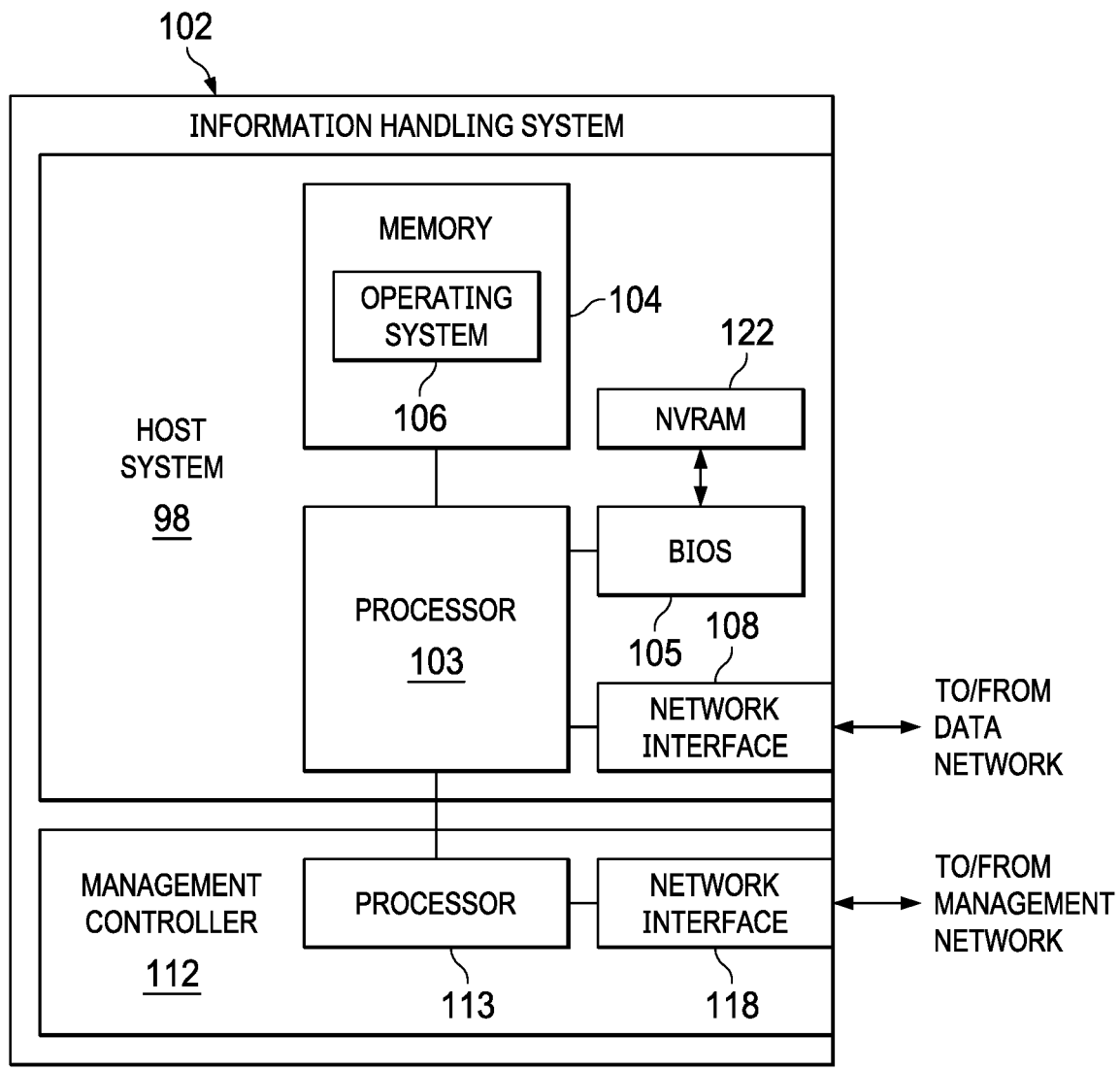
FIG. 1 illustrates a block diagram of an example information handling system, in accordance with embodiments of the present disclosure.
Figure 2:
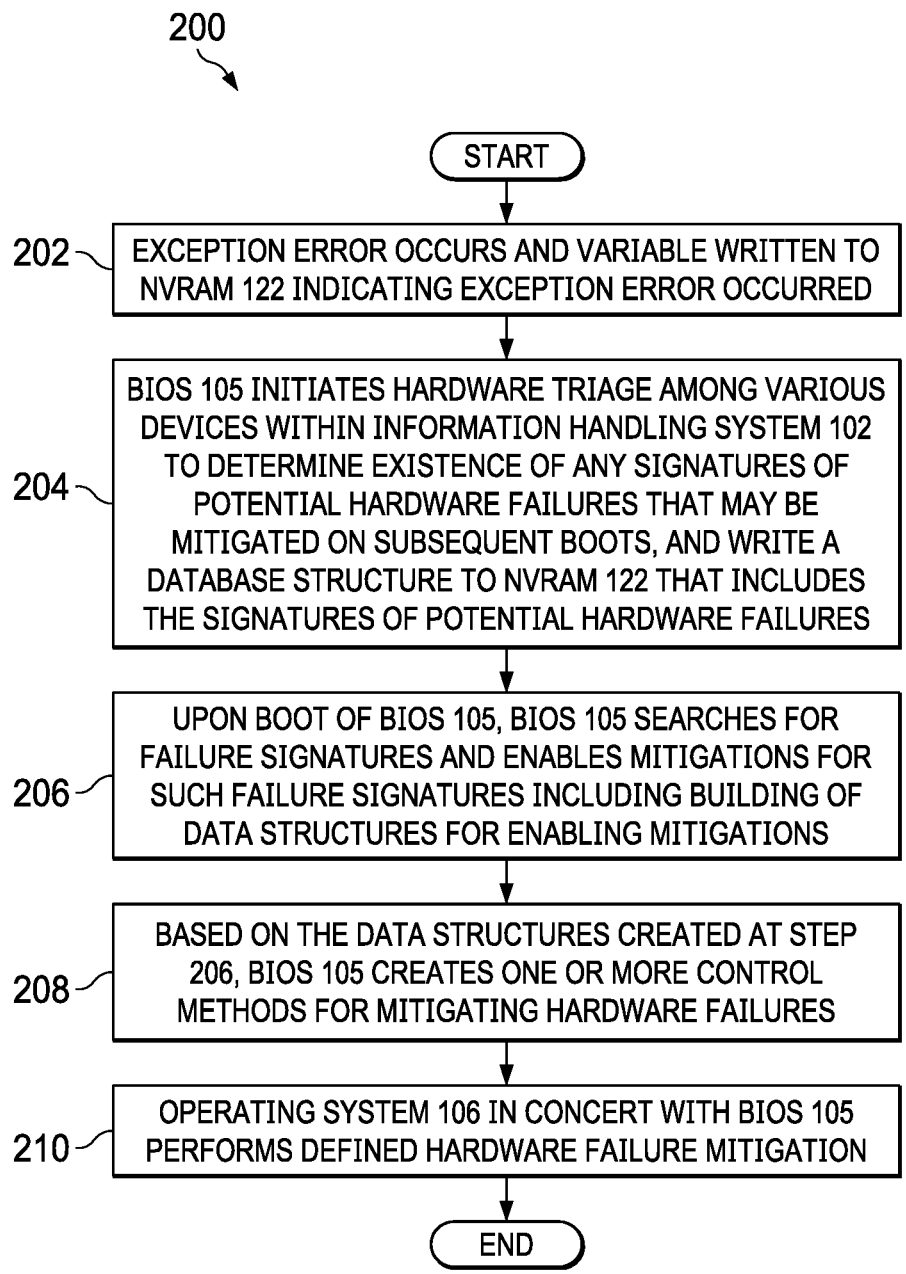
FIG. 2 illustrates a flowchart of an example method for dynamically resolving hardware failures in an information handling system, in accordance with embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, a management controller 112 communicatively coupled to processor 103, and a non-volatile memory (NVRAM) 122 for BIOS 105.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102. Although FIG. 1 depicts host system 98, in some embodiments of the present disclosure, information handling system 102 may not include a host system 98.

Management controller 112 may be configured to provide management facilities for management of information handling system 102. Such management may be made by management controller 112 even if information handling system 102 is powered off or powered to a standby state. Management controller 112 may include a processor 113 and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112. As shown in FIG. 1, processor 113 may be communicatively coupled to processor 103. Such coupling may be via a Universal Serial Bus (USB), System Management Bus (SMBus), and/or one or more other communications channels.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

NVRAM 122 may include any system, device, or apparatus configured to retain program instructions and/or data for a period of time, and may include non-volatile memory that retains data after power to information handling system 102 is turned off. For example, in some embodiments, NVRAM 122 may comprise a flash storage device. In some embodiments, NVRAM 122 may store thereon one or more firmware images, including firmware for BIOS 105, configuration code, or other executable code.

In addition to processor 103, memory 104, network interface 108, management controller 112, and NVRAM 122, information handling system 102 may include one or more other information handling resources.

In operation, during execution of operating system 106, an exception error or stop error may occur, which is often termed the "Blue Screen of Death." When such an exception error occurs, a variable (e.g., a variable "BugCheckCode") may be written to NVRAM 122. Responsive to the exception error, which may be indicated by the variable written to NVRAM 122, BIOS 105 may, on a boot session subsequent to that of the exception error, initiate a hardware triage among various devices within information handling system 102 to determine the existence of any hardware failures that may be mitigated on subsequent boots, and write a database structure to NVRAM 122 that includes signatures of hardware failures.

Upon boot of BIOS 105, BIOS 105 may search for failure signatures and enable mitigations for such failure signatures. For mitigations that may occur within operating system 106 or require Advanced Configuration and Power Interface (ACPI) support, such mitigations may be processed by ACPI polling events. Mitigations for hang events of operating system 106 may be processed by periodic System Management Interrupt (SMI) events. Signature information may be updated with device state conditions during polling events.

FIG. 2 illustrates a flowchart of an example method 200 for dynamically resolving hardware failures in information handling system 102, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, an exception error may occur and a variable (e.g., a variable "BugCheckCode") may be written to NVRAM 122 indicating the exception error occurred.

At step 204, responsive to the exception error, which may be indicated by the variable written to NVRAM 122, BIOS 105 may, during the same boot session, initiate a hardware triage among various devices within information handling system 102 to determine the existence of any signatures of potential hardware failures that may be mitigated on subsequent boots, and write a database structure to NVRAM 122 that includes signatures of potential hardware failures.

For example, in some embodiments, such hardware triage may include analyzing Peripheral Component Interconnect Express (PCIe) buses of information handling system 102 for failures that can be mitigated on subsequent boots.

As another example, in these and other embodiments, for Serial Advanced Technology Attachment (SATA), Advanced Host Controller Interface (AHCI), Redundant Array of Inexpensive Disks (RAID), class code devices, or similar devices, BIOS 105 may triage such devices by analyzing each connected port for a busy status, waiting up to a period of time (e.g., eight seconds) for such busy status to clear, and if a port fails to clear, write an NVRAM variable (e.g., called "PeriodicSmiMitigation_SATA") with a Global Unique Identifier (GUID) (e.g., PERIOD_SMI_MITIGATION_GUID), and include an address (e.g., a PCIe address) of the SATA/AHCI/RAID controller, the port of the busy device, and a mitigation method number (e.g., a mitigation method number associated with power cycling a hard disk drive power cycle).

As a further example, in these and other embodiments, for Universal Serial Bus (USB) class code devices, BIOS 105 may triage such devices by determining if the USB controller ownership bit is still set to BIOS ownership. If so, BIOS 105 may write to NVRAM 122 a variable (e.g., called "PeriodicSmiMitigation_USB" with a GUID (e.g., PERIOD_SMI_MITIGATION_GUID), and include an address (e.g., a PCIe address) of the USB controller and a mitigation method number (e.g., in this case, a mitigation method number associated with clearing the USB controller BIOS ownership).

As yet another example, in these and other embodiments, also for USB class code devices, BIOS 105 may triage such devices by looking at each port status in the controller, looking for overcurrent conditions. If overcurrent conditions exist, BIOS 105 may write to NVRAM 122 a variable (e.g., called "PeriodicSmiMitigation_USB") with a GUID (e.g., PERIOD_SMI_MITIGATION_GUID) and include an address (e.g., a PCIe address) of the USB controller and a mitigation method number (e.g., in this case, a mitigation method number associated with clearing overcurrent status and resetting the USB port).

As yet another example, in these and other embodiments, on PCIe bridge class code devices, BIOS 105 may triage such devices by determining if a downstream bridge bus number is configured, but no device is present on such bus. If so, BIOS 105 may write to NVRAM 122 a variable (e.g., called "ACPI_Poll_Mitigation_PCIE") with a GUID (e.g., ACPI_POLL_MITIGATION_GUID) and include an address (e.g., PCIe address) of the PCIe bridge, and a mitigation method number (e.g., in this case, sending a hot reset to the PCIe bridge, restoring PCIe settings saved at the ACPI_WAK method, with ACPI sending a Notify (0x80) to force operating system 106 to re-enumerate the PCIe bridge and device).

As yet another example, in these and other embodiments, for real-time clock (RTC) register validation, BIOS 105 may triage such devices by confirming the RTC register indicates that the RTC time of day clock is enabled. If so, BIOS 105 may write to NVRAM 122 a variable (e.g., called "ACPI_Poll_Mitigation_RTC") with a GUID (e.g., ACPI_POLL_MITIGATION_GUID), and a mitigation method number (e.g., in this case, writing an appropriate value to an RTC register).

As yet another example, in these and other embodiments, for a periodic timer stall of a programmable interrupt controller, BIOS 105 may analyze all processor cores for an unmasked timer and confirm if a system timer is in a periodic mode, and determine if the timer current count is zero for a predefined period of time (e.g., 500 microseconds). If an error condition is indicated, BIOS 105 may write to NVRAM 122 a variable (e.g., called "ACPI_Poll_Mitigation_X2APIC") with a GUID (e.g., ACPI_POLL_MITIGATION_GUID), and a mitigation method number (e.g., in this case rewriting an INITIAL_COUNT value if non-zero, or writing the INITIAL_COUNT value to an appropriate value).

As yet another example, in these and other embodiments, for a one-shot timer stall of a programmable interrupt controller, BIOS 105 may analyze all processor cores for an unmasked timer and confirm if a system timer is in a one-shot mode. If the one-shot flag remains clear, BIOS 105 may save the INITIAL count register to compare on the next poll and set a flag to indicate that this was the first one-shot poll. If the one-shot flag is set, BIOS 105 may clear the one-shot flag and if the INITIAL_COUNT register matches the saved value (e.g., the same event is still stalled), BIOS 105 may write a variable (e.g., called "ACPI_Poll_Mitigation_X2APIC") to NVRAM 122 with a GUID (e.g., ACPI_POLL_MITIGATION_GUID), and a mitigation method number (e.g., in this case rewriting the INITIAL_COUNT value if non-zero, or writing the INITIAL_COUNT value to an appropriate value).

At step 206, upon boot of BIOS 105, BIOS 105 may search for failure signatures and enable mitigations for such failure signatures. For example, BIOS 105 may read NVRAM 122 to look for any variables with the GUID ACPI_POLL_MITIGATION_GUID and load the contents of any such variables into an ACPI-accessible data structure. If any variable of NVRAM 122 has the GUID ACPI_POLL_MITIGATION_GUID, an ACPI flag may be set to enable ACPI polling mitigation, as described in more detail below. As another example, BIOS 105 may read NVRAM 122 to look for any variables with the GUID PERIODIC_SMI_MITIGATION_GUID and load the contents of any such variables into an SMI-accessible data structure. If any variable of NVRAM 122 has the GUID PERIODIC_SMI_MITIGATION_GUID, BIOS 105 may enable a periodic SMI handler for a periodic SMI mitigation feature.

At step 208, based on the data structures created at step 206, BIOS 105 may create one or more control methods for mitigating hardware failures. For example, for ACPI-accessible data structures, BIOS 105 may, for all permanent devices and all devices built-in to supported docks for which the device can fail in a detectable manner or has failed on other information handling systems:

(a) Create an ACPI control method under the device definition, called "POLL". This control method may return TRUE if the failure signature is detected.

(b) Create an ACPI control method called "RSET" which attempts to reset the device, and returns TRUE if the failure was resolved or FALSE otherwise. Results may be written to a memory log.

(c) Create an ACPI control method called "PWER" which attempts to briefly remove power from the device, and returns TRUE if this resolved the failure. Results may be written to a memory log.

(d) Create an ACPI control method called "CSTM" which attempts to resolve the failure in a custom manner, such as calling a software SMI or performing a complex sequence. If video was non-responsive, for example, an SMI handler could simulate a key sequence (e.g., Shift-Control-Windows-B) that causes operating system 106 to reload the video driver. Results may be written to a memory log.

BIOS 105 may also create a "FREQ" variable to indicate a default polling frequency and initialize to a predetermined period of time (e.g., 30 seconds).

BIOS 105 may further create an ACPI control method called "PALL" that may call all "POLL" routines. If a "POLL" routine returns TRUE for a device, the "PALL" method may do one of the following:

call the "RSET" method to perform a non-power removal reset of a device;

call the "PWR" method to perform a power cycle reset of the device; and call the "CSTM" to perform customized mitigation steps.

BIOS 105 may further create a hook or method that may occur at a regular pre-defined frequency (e.g., once per second). For example, BIOS 105 may initialize a count to "FREQ," decrement the count once per method of execution, and when the count reaches zero, call the "PALL" method.

At step 210, operating system 106 may execute and in concert with BIOS 105 may perform hardware failure mitigation. For example, an ACPI poll mitigation handler may read a failure address, port, and mitigation from an ACPI polling data structure created at boot. Such parameters may be passed as parameters to an ACPI control method associated with the class type found in the data structure. The ACPI control method may execute a control method to determine if the signature for the selected mitigation is present. If the signature is present, the control method for such mitigation may be executed.

As another example, a periodic SMI poll mitigation handler may read a failure address, port, and mitigation from the periodic SMI data structure created at boot. Such parameters may be passed as parameters to an SMI handler associated with the class type found in the data structure. The SMI handler may determine if the signature for the selected mitigation is present. If the signature is present, the code for such mitigation may be executed.

After completion of step 210, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

The methods and systems disclosed herein may proactively resolve potential and low-frequency hardware problems, including impossible to prevent silicon failures. The methods and systems disclosed herein may also log failures to an NVRAM (which may further be uploaded to a manufacturer of the information handling system, such that an appropriate permanent mitigation or remedy may quickly be initiated). The methods and systems disclosed herein may further poll for previously-encountered hardware failures at regular intervals and poll infrequently if an issue has yet to occur during a boot session in order to minimize any performance impact, but increase poll frequency if a failure is confirmed. The systems and methods disclosed herein may additionally create common ACPI infrastructure for all hardware workarounds and may support hardware failure resolution by device reset, device power cycle, or complex sequences including software SMIs.

The systems and methods disclosed herein may also provide for a library of failure signature detection and mitigation plans present in BIOS, wherein failure detection code is inaccessible until a failure signature has been detected at least once during an exception event. A write of exception information to NVRAM as a result of an exception event may be intercepted to test the entire library of failure signatures, and write an NVRAM record of all failure signatures found and which predefined mitigation(s) may resolve the issue. Based on NVRAM variables, failure detection mitigation methods may be enabled at boot time. Mitigation occurring in an operating system or that requires ACPI support may be processed by an ACPI polling event. Mitigation for operating system hang events may be processed by a periodic SMI event.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system configured to:
      responsive to an occurrence of an exception error, triage among various hardware components of the information handling system to determine existence of any signatures of potential hardware failures;

write a database structure to a non-volatile memory including the signatures of potential hardware failures;

upon boot of the basic input/output system, enable one or more control methods for hardware failure mitigations associated with the signatures of potential hardware failures; and perform the mitigations during execution of an operating system of the information handling system.

2. The information handling system of claim 1, the basic input/output system further configured to create the one or more control methods based on the database structure.

3. The information handling system of claim 1, the basic input/output system further configured to determine the exception error based on a variable indicating the exception error.

4. The information handling system of claim 1, wherein the one or more control methods comprise Advanced Configuration and Power Interface polling events.

5. The information handling system of claim 1, wherein the one or more control methods comprise periodic System Management Interface events.

6. The information handling system of claim 1, wherein the basic input/output system comprises a library of failure signature detection mechanisms and plans for hardware mitigations.

7. The information handling system of claim 1, wherein the basic input/output system is further configured to disable hardware failure mitigations for which associated signatures of potential hardware failures are absent.

8. A method comprising, in a basic input/output system of an information handling system:

responsive to an occurrence of an exception error, triaging among various hardware components of the information handling system to determine existence of any signatures of potential hardware failures;

writing a database structure to a non-volatile memory including the signatures of potential hardware failures;

upon boot of the basic input/output system, enabling one or more control methods for hardware failure mitigations associated with the signatures of potential hardware failures; and performing the mitigations during execution of an operating system of the information handling system.

9. The method of claim 8, further comprising creating the one or more control methods based on the database structure.

10. The method of claim 8, further comprising determining the exception error based on a variable indicating the exception error.

11. The method of claim 8, wherein the one or more control methods comprise Advanced Configuration and Power Interface polling events.

12. The method of claim 8, wherein the one or more control methods comprise periodic System Management Interface events.

13. The method of claim 8, wherein the basic input/output system comprises a library of failure signature detection mechanisms and plans for hardware mitigations.

14. The method of claim 8, further comprising disabling hardware failure mitigations for which associated signatures of potential hardware failures are absent.

15. An article of manufacture comprising:

a processor;

a non-transitory computer-readable medium; and computer-executable instructions carried on the computer-readable medium, the instructions readable by the processor, the instructions, when read and executed, for causing the processor to, in a basic input/output system of an information handling system:

responsive to an occurrence of an exception error, triage among various hardware components of the information handling system to determine existence of any signatures of potential hardware failures;

write a database structure to a non-volatile memory including the signatures of potential hardware failures;

upon boot of the basic input/output system, enable one or more control methods for hardware failure mitigations associated with the signatures of potential hardware failures; and perform the mitigations during execution of an operating system of the information handling system.

16. The article of claim 15, the instructions for further causing the processor to create the one or more control methods based on the database structure.

17. The article of claim 15, the instructions for further causing the processor to determine the exception error based on a variable indicating the exception error.

18. The article of claim 15, wherein the one or more control methods comprise Advanced Configuration and Power Interface polling events.

19. The article of claim 15, wherein the one or more control methods comprise periodic System Management Interface events.

20. The article of claim 15, wherein the basic input/output system comprises a library of failure signature detection mechanisms and plans for hardware mitigations.

21. The article of claim 15, the instructions for further causing the processor to disable hardware failure mitigations for which associated signatures of potential hardware failures are absent.

* * * * *